(12) United States Patent
Kurokawa

(10) Patent No.: US 8,216,655 B2
(45) Date of Patent: Jul. 10, 2012

(54) OPTICAL INFORMATION RECORDING MEDIUM

(75) Inventor: Kotaro Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 12/477,589

(22) Filed: Jun. 3, 2009

(65) Prior Publication Data

US 2009/0311461 A1    Dec. 17, 2009

(30) Foreign Application Priority Data

Jun. 11, 2008    (JP) ................ 2008-153200

(51) Int. Cl.
  *B32B 3/02*    (2006.01)
(52) U.S. Cl. ............... 428/64.1; 428/64.4; 428/64.5; 428/64.6; 430/270.13
(58) Field of Classification Search ........... 428/64.5; 430/270.13
  See application file for complete search history.

(56) References Cited

U.S. PATENT DOCUMENTS 7,449,225 B2 * 11/2008 Nishihara et al. ............ 428/64.4
2004/0105182 A1  6/2004 Nishihara et al.

FOREIGN PATENT DOCUMENTS

| JP | 2003-013201 | 1/2003 |
|---|---|---|
| JP | 2004-110911 | 4/2004 |
| JP | 2004-185798 | 7/2004 |
| JP | 2007-026503 | 2/2007 |
| JP | 2007-290350 | 11/2007 |
| JP | 2008-097794 | 4/2008 |
| WO | 03/025922 | 3/2003 |

OTHER PUBLICATIONS

Japanese Office Action issued on May 18, 2010 corresponding to Japanese Patent Appln. No. 2008-153200.

* cited by examiner

*Primary Examiner* — Elizabeth Mulvaney
(74) *Attorney, Agent, or Firm* — K&L Gates LLP

(57) ABSTRACT

An optical information recording medium is provided and includes a supporting substrate, a light-transmissive protective layer, information recording layers, and at least one interlayer transparent to a laser beam having a wavelength of 400 to 410 nm. Among the information recording layers, one or a plurality of information recording layers other than the information recording layer closest to the supporting substrate each function as a semi-transmissive information recording layer that transmits the laser beam. Some or all of the one or the plurality of semi-transmissive information recording layer include, from the laser beam incident side, a first dielectric portion having a refractive index of 2.4 or more for the wavelength of the laser beam, a recording material portion having a thickness of at least 5.2 nm, a second dielectric portion, a metal portion having a thickness of at least 7 nm, and a third dielectric portion in that order.

15 Claims, 12 Drawing Sheets

INCREASING RATE OF DEFECTS IN ENVIRONMENTAL TEST
TEST ENVIRONMENT: 80°C, 85%, 120 HOURS

SIGNAL REWRITE PROPERTY: ERASE RATIO
REWRITE CONDITION: BLU-RAY AT DOUBLE SPEED

FIG. 5A

|  | FIRST INFORMATION RECORDING LAYER | SECOND INFORMATION RECORDING LAYER |
|---|---|---|
| REFLECTIVITY ri/ti | 20% | 6% |
| TRANSMITTANCE | 0% | 50% |
| ABSORPTIVITY | 80% | 44% |

FIG. 5B

|  | FIRST INFORMATION RECORDING LAYER | SECOND INFORMATION RECORDING LAYER |
|---|---|---|
| REFLECTIVITY r | 4% | 4.5% |
| ABSORPTIVITY | 38% | 42% |

FIG. 5C

|  | FIRST INFORMATION RECORDING LAYER | SECOND INFORMATION RECORDING LAYER | THIRD INFORMATION RECORDING LAYER |
|---|---|---|---|
| REFLECTIVITY ri/ti | 20% | 6% | 3% |
| TRANSMITTANCE | 0% | 50% | 70% |
| ABSORPTIVITY | 80% | 44% | 27% |

FIG. 5D

|  | FIRST INFORMATION RECORDING LAYER | SECOND INFORMATION RECORDING LAYER | THIRD INFORMATION RECORDING LAYER |
|---|---|---|---|
| REFLECTIVITY r | 2% | 2.2% | 2.2% |
| ABSORPTIVITY | 27% | 29% | 26% |

FIG. 6A

|  | FIRST INFORMATION RECORDING LAYER | SECOND INFORMATION RECORDING LAYER | THIRD INFORMATION RECORDING LAYER | FOURTH INFORMATION RECORDING LAYER |
|---|---|---|---|---|
| REFLECTIVITY ri/ti | 20% | 6% | 3% | 1.7% |
| TRANSMITTANCE | 0% | 50% | 70% | 78% |
| ABSORPTIVITY | 80% | 44% | 27% | 20% |

FIG. 6B

|  | FIRST INFORMATION RECORDING LAYER | SECOND INFORMATION RECORDING LAYER | THIRD INFORMATION RECORDING LAYER | FOURTH INFORMATION RECORDING LAYER |
|---|---|---|---|---|
| REFLECTIVITY r | 1.2% | 1.3% | 1.3% | 1.3% |
| ABSORPTIVITY | 21% | 23% | 20% | 20% |

FIG. 7A

|  | FIRST INFORMATION RECORDING LAYER | SECOND INFORMATION RECORDING LAYER | THIRD INFORMATION RECORDING LAYER |
|---|---|---|---|
| REFLECTIVITY ri/ti | 25% | 7% | 3% |
| TRANSMITTANCE | 0% | 50% | 65% |
| ABSORPTIVITY | 75% | 43% | 32% |

FIG. 7B

|  | FIRST INFORMATION RECORDING LAYER | SECOND INFORMATION RECORDING LAYER | THIRD INFORMATION RECORDING LAYER |
|---|---|---|---|
| REFLECTIVITY r | 2% | 2.2% | 2.2% |
| ABSORPTIVITY | 23% | 27% | 30% |

FIG. 9

|  | SAMPLE No. |  | FIRST DIELECTRIC PORTION 11 | | | SECOND DIELECTRIC PORTION 13 | THIRD DIELECTRIC PORTION 15 | | REFLECTIVITY | | TRANSMITTANCE | |
|---|---|---|---|---|---|---|---|---|---|---|---|---|
|  |  |  | DIELECTRIC MATERIAL a | DIELECTRIC MATERIAL b | DIELECTRIC MATERIAL c | DIELECTRIC MATERIAL d | DIELECTRIC MATERIAL e | DIELECTRIC MATERIAL f | IN CRYSTALLINE STATE | IN AMORPHOUS STATE | IN CRYSTALLINE STATE | IN AMORPHOUS STATE |
| COMPARATIVE EXAMPLES | S1 | MATERIAL |  | SiN |  | SiN | SiN |  | 3.1 | 0.05 | 52 | 51.5 |
|  |  | REFRACTIVE INDEX |  | 2.1 |  | 2.1 | 2.1 |  |  |  |  |  |
|  |  | THICKNESS (nm) |  | 35 |  | 10 | 15 |  |  |  |  |  |
|  | S2 | MATERIAL |  | SiN |  | SiN | $Nb_2O_5$ |  | 3.7 | 0.4 | 54.9 | 54.7 |
|  |  | REFRACTIVE INDEX |  | 2.1 |  | 2.1 | 2.55 |  |  |  |  |  |
|  |  | THICKNESS (nm) |  | 35 |  | 3 | 10 |  |  |  |  |  |
| EXAMPLES | S3 | MATERIAL |  | $Nb_2O_5$ |  | SiN | SiN |  | 3.1 | 0.3 | 60.5 | 60.2 |
|  |  | REFRACTIVE INDEX |  | 2.55 |  | 2.1 | 2.1 |  |  |  |  |  |
|  |  | THICKNESS (nm) |  | 29 |  | 3 | 37 |  |  |  |  |  |
|  | S4 | MATERIAL |  | $Nb_2O_5$ |  | SiN | $Nb_2O_5$ |  | 3 | 0.3 | 66.8 | 66.8 |
|  |  | REFRACTIVE INDEX |  | 2.55 |  | 2.1 | 2.55 |  |  |  |  |  |
|  |  | THICKNESS (nm) |  | 32 |  | 3 | 25 |  |  |  |  |  |
|  | S5 | MATERIAL |  | $Nb_2O_5$ |  | SiN | $TiO_2$ | $Nb_2O_5$ | 3 | 0.7 | 68.6 | 68.4 |
|  |  | REFRACTIVE INDEX |  | 2.55 |  | 2.1 | 2.77 | 2.55 |  |  |  |  |
|  |  | THICKNESS (nm) |  | 30 |  | 3 | 5 | 21 |  |  |  |  |
|  | S6 | MATERIAL |  | $Nb_2O_5$ | SiN | SiN | $Nb_2O_5$ |  | 3.1 | 0.6 | 66.7 | 66.7 |
|  |  | REFRACTIVE INDEX |  | 2.55 | 2.1 | 2.1 | 2.55 |  |  |  |  |  |
|  |  | THICKNESS (nm) |  | 25 | 5 | 3 | 25 |  |  |  |  |  |
|  | S7 | MATERIAL |  | $Nb_2O_5$ | SiN | SiN | $TiO_2$ | $Nb_2O_5$ | 3.1 | 0.7 | 68.1 | 68.1 |
|  |  | REFRACTIVE INDEX |  | 2.55 | 2.1 | 2.1 | 2.77 | 2.55 |  |  |  |  |
|  |  | THICKNESS (nm) |  | 25 | 5 | 3 | 5 | 20 |  |  |  |  |
|  | S8 | MATERIAL | SiN | $Nb_2O_5$ | SiN | SiN | $Nb_2O_5$ |  | 3 | 0.3 | 65.5 | 65.4 |
|  |  | REFRACTIVE INDEX | 2.1 | 2.55 | 2.1 | 2.1 | 2.55 |  |  |  |  |  |
|  |  | THICKNESS (nm) | 5 | 25 | 5 | 3 | 22 |  |  |  |  |  |
|  | S9 | MATERIAL | $SiO_2$ | $Nb_2O_5$ |  | SiN | $Nb_2O_5$ |  | 2.7 | 0.25 | 67 | 66.9 |
|  |  | REFRACTIVE INDEX | 1.48 | 2.55 |  | 2.1 | 2.55 |  |  |  |  |  |
|  |  | THICKNESS (nm) | 10 | 32 |  | 3 | 25 |  |  |  |  |  |
|  | S10 | MATERIAL | $SiO_2$ | $Nb_2O_5$ | SiN | SiN | $Nb_2O_5$ |  | 3 | 0.6 | 66.9 | 66.7 |
|  |  | REFRACTIVE INDEX | 1.48 | 2.55 | 2.1 | 2.1 | 2.55 |  |  |  |  |  |
|  |  | THICKNESS (nm) | 10 | 25 | 5 | 3 | 25 |  |  |  |  |  |

FIG. 14

| MATERIAL | REFRACTIVE INDEX | EXTINCTION COEFFICIENT |
|---|---|---|
| $Nb_2O_5$ | 2.56 | 0 |
| $TiO_2$ | 2.7 | 0.01 |
| ZnS | 2.6 | 0.01 |
| $CeO_2$ | 2.73 | 0 |
| $Bi_2O_3$ | 2.93 | 0.05 |

OPTICAL INFORMATION RECORDING MEDIUM

CROSS REFERENCES TO RELATED APPLICATIONS

The present application claims priority to that disclosed in Japanese Priority Patent Application JP 2008-153200 filed in the Japan Patent Office on Jun. 11, 2008, the entire contents of which is hereby incorporated by reference.

BACKGROUND

The present application relates to an optical information recording medium in which information is recorded, erased, or read by changing a state of a recording layer by irradiating the recording layer with light, and by reading the change as a change in an optical response.

A phase-change optical recording medium, which utilizes a transition between a crystal phase and an amorphous phase or between two crystal phases of a crystal 1 and a crystal 2 is known as an optical memory medium that can record, reproduce, and erase information by irradiation of a laser beam. As such a phase-change optical recording medium, for example, a CD-RW (Compact Disc-Rewritable), a DVD-RW (Digital Versatile Disc-Rewritable), and a DVD-RAM (Digital Versatile Disc-Random Access Memory) have been commercially available. Recording materials containing GeSbTe, AgInSbTe, or the like as a main component have been widely known as materials of a recording layer used in the phase-change recording method, and have been practically used in a rewritable optical disc.

Recently, a high-density optical disc compatible with a blue laser wavelength, typically represented by a Blu-ray Disc (registered trademark), and a disc drive device compatible with such a disc have been commercialized. In the standards of such a high-density optical disc such as a Blu-ray Disc, a standard of a double-layer disc which is not included in the standards of a CD-RW, DVD-RW, or a DVD-RAM among rewritable (phase-change) optical discs has been included and practically used. The realization of a double-layer disc in the field of rewritable optical discs has come from the technical finding that a phase-change recording material and a metal thin film used in an information recording layer more readily transmit a blue laser beam than a red laser beam. In addition, desires for a mass storage and a long-time video recording are constantly present for optical information recording media. These desires have also promoted the development of a double-layer disc.

FIG. 15A schematically shows a structure of a double-layer disc (layer structure in the thickness direction of the disc). A phase-change double-layer disc has the following layer structure. Specifically, a first information recording layer 101 is provided on a supporting substrate 100 made of a plastic such as polycarbonate. Furthermore, an interlayer 102 that is transparent to a wavelength of a recording/reproducing laser beam is provided on the first information recording layer 101, and a second information recording layer 103 is provided on the interlayer 102. A light-transmissive protective layer (cover layer) 104 that is transparent to the recording/reproducing wavelength is further provided on the second information recording layer 103. The laser beam used for recording and reproducing is incident from the light-transmissive protective layer 104 side through an objective lens (not shown). The laser beam passing through the objective lens is condensed on the first information recording layer 101 or the second information recording layer 103 to perform recording or reproduction of information.

A feature of the phase-change double-layer disc lies in the second information recording layer 103. The second information recording layer 103 is formed by depositing a dielectric material, a metal, a phase-change recording material, and the like using a sputtering apparatus so as to exhibit a recording/reproducing performance. As shown in FIG. 15A, for example, a typical laminated structure includes, when viewed from the laser beam incident side, a first dielectric portion 111, a recording material portion 112, a second dielectric portion 113, a metal portion 114, and a third dielectric portion 115 in that order. That is, in producing the disc, the layer structure is formed by sequentially laminating the third dielectric portion 115, the metal portion 114, the second dielectric portion 113, the recording material portion 112, and the first dielectric portion 111 on the interlayer 102. Specifically, in producing the disc, the layer structure is formed by sequentially laminating the third dielectric portion 115, the metal portion 114, the second dielectric portion 113, the recording material portion 112, and the first dielectric portion 111 on the interlayer 102. The recording material portion 112 is made of a phase-change recording material. The metal portion 114 functions as a reflective film for a laser beam. The second information recording layer 103 functions as a semi-transmissive information recording layer having a property of transmitting light used for recording and reproducing in the first information recording layer 101. The second information recording layer 103 is designed so that the second information recording layer 103 has a light transmittance in the range of about 45% to 55% and a recording/reproducing power and the reflectivity of the first information recording layer and second information recording layer are equivalent to each other, from the viewpoint of an optical disc recording/reproducing device (drive). As a method of obtaining such a high light transmittance, PCT Publication No. WO03/025922 Pamphlet describes a method in which a high-refractive-index transparent dielectric material is used as a dielectric material in a semi-transmissive information recording layer, the dielectric material being arranged between an interlayer material disposed at a supporting substrate side with respect to the semi-transmissive information recording layer and a metal reflective film in the semi-transmissive information recording layer.

As described above, in the phase-change double-layer disc, it is necessary that the semi-transmissive information recording layer (second information recording layer 103) disposed at the light incident side have a high light transmittance of about 50%. For this purpose, a technique is used in which the thicknesses of the recording material portion 112 and the metal portion 114 (metal reflective film) are extremely reduced. However, because of this structure, it is difficult to ensure reliability of storage in an optical disc media and a recording/reproducing signal characteristic of information. If the light transmittance can be increased without decreasing the thicknesses of the recording material portion 112 and the metal portion 114, the information recording layer can be designed so that the recording material portion 112 and the metal portion 114 have large thicknesses, and thus the reliability and the recording/reproducing signal characteristic can be improved. Consequently, a development of a technique for increasing the light transmittance without extremely decreasing the thicknesses of the recording material portion 112 and the metal portion 114 in a semi-transmissive information recording layer has been desired.

Furthermore, in full-scale operation of digital broadcasting and the like, demands on higher capacity information recording media have been increasing, and an optical disc having a higher storage capacity has also been desired. One method for realizing a higher storage capacity is to further increase the number of layers of an optical disc. For example, a standard Blu-ray single-layer disc has a capacity of 25 gigabyte (GB), and a Blu-ray double-layer disc has a capacity of 50 GB. If the disc can have three layers, the capacity can be increased to 75 GB. If the disc can have four layers, 100 GB can be realized. Furthermore, it is estimated that, by combining a latest signal-processing technique, a capacity of 100 GB can be realized in a three-layer disc, and a capacity of 130 GB can be realized in a four-layer disc. In order to realize a three-layer disc, a third information recording layer is formed at the light-transmissive protective layer side with respect to the second information recording layer, with an interlayer that is transparent to a recording/reproducing laser beam therebetween. Specifically, as schematically shown in FIG. 15B, such a three-layer disc has a layer structure in which a first information recording layer 201, a first interlayer 202, a second information recording layer 203, a second interlayer 204, a third information recording layer 205, and a light-transmissive protective layer 206 are disposed on a supporting substrate 200. The second information recording layer 203 and the third information recording layer 205 function as semi-transmissive information recording layers. As in the second information recording layer 103 shown in FIG. 15A, the information recording layers may have a structure including, when viewed from the laser beam incident side, a first dielectric portion 111, a recording material portion 112, a second dielectric portion 113, a metal portion 114, and a third dielectric portion 115 in that order.

In the case where the third information recording layer 205 having the above structure is formed by further developing the double-layer disc that has been practically used to realize a three-layer disc, it is necessary that the third information recording layer 205 have a transmittance in the range of 65% to 75%. This is a transmittance range obtained by considering the reflectivity of each recording layer of the double-layer disc and the transmittance (about 50%) of the second information recording layer, and considering the balances of the reflectivity from each information recording layer and recording power. In order to increase the reflectivity from each of the first and second information recording layers 201 and 203, a higher transmittance of the third information recording layer 205 is necessary.

A main factor that decreases the transmittance in the information recording layer functioning as the semi-transmissive information recording layer, that is, in the information recording layer other than the first information recording layer 101 or 201 lies in light absorption in the metal portion 114 and the recording material portion 112 made of a phase-change material. Since the metal portion 114 and the recording material portion 112 deeply relate to thermal properties related to recording and reproducing, a rewrite performance, and the like, it is difficult to significantly change the materials of these portions. Therefore, it is assumed that the transmittance is improved by decreasing the thicknesses of the metal portion 114 and the recording material portion 112, but as described above, it is desirable that a significant decrease in the thicknesses be avoided.

As described above, the information recording layer is a laminated film, and is optically a multiple optical interference film. Therefore, by optimizing the thicknesses of the films to be laminated, the information recording layer can be designed so as to have a high transmittance. PCT Publication No. WO03/025922 Pamphlet proposes that in order to increase the transmittance of the second information recording layer 103, a material having a refractive index as high as possible is arranged as the third dielectric portion 115, which is in contact with the interlayer 102 in the second information recording layer 103, though this technique relates to a double-layer disc. The refractive index of the material is 2.4 or more.

However, the light transmittance that can be realized by this structure is less than 65% at most. A further factor is necessary in order to realize a transmittance of 65% to 75% necessary for a three-layer disc. Accordingly, it is desirable to propose a technique for realizing a higher transmittance in a semi-transmissive information recording layer without extremely decreasing the thicknesses of a metal portion and a recording material portion, thereby realizing practical application of a three-layer disc, a four-layer disc, and the like.

SUMMARY

An optical information recording medium according to an embodiment includes a supporting substrate; a light-transmissive protective layer disposed at the side of the optical information recording medium on which a recording/reproducing laser beam is incident; a plurality of information recording layers; and at least one interlayer which is transparent to the recording/reproducing laser beam having a wavelength in the range of 400 to 410 nm, and each one of which is disposed between adjacent information recording layers, the information recording layers and the at least one interlayer being disposed between the supporting substrate and the light-transmissive protective layer. Among the plurality of information recording layers, one or a plurality of information recording layers other than the information recording layer closest to the supporting substrate each function as a semi-transmissive information recording layer that transmits the laser beam. Some or all of the one or the plurality of semi-transmissive information recording layers have a structure including, from the incident side of the laser beam, a first dielectric portion having a refractive index of 2.4 or more for the wavelength of the recording/reproducing laser beam, a recording material portion having a thickness of at least 5.2 nm, a second dielectric portion, a metal portion having a thickness of at least 7 nm, and a third dielectric portion in that order.

The third dielectric portion also preferably has a refractive index of 2.4 or more for the wavelength of the recording/reproducing laser beam.

Furthermore, when the first dielectric portion has a certain refractive index of 2.4 or more, the third dielectric portion of the semi-transmissive information recording layer is preferably configured to have a refractive index in a refractive index range where the transmittance of the semi-transmissive information recording layer is not more than 1% lower than the maximum transmittance of the semi-transmissive information recording layer to control the light transmittance of the semi-transmissive information recording layer to be 65% or more.

Each of the first dielectric portion and the third dielectric portion preferably has an extinction coefficient of 0.04 or less.

When the optical information recording medium is a three-layer recording medium having the information recording layers including a first information recording layer closest to the supporting substrate and a second information recording layer and a third information recording layer which function as the semi-transmissive information recording layers, the third information recording layer preferably has a structure including the first dielectric portion having a refractive index of 2.4 or more for the wavelength of the recording/reproducing laser beam, the recording material portion having a thickness of at least 5.2 nm, the second dielectric portion, the metal portion having a thickness of at least 7 nm, and the third dielectric portion.

Alternatively, when the optical information recording medium is a four-layer recording medium having the information recording layers including a first information recording layer closest to the supporting substrate and a second information recording layer, a third information recording layer, and a fourth information recording layer which function as the semi-transmissive information recording layers, each of the third information recording layer and the fourth information recording layer preferably has a structure including the first dielectric portion having a refractive index of 2.4 or more for the wavelength of the recording/reproducing laser beam, the recording material portion having a thickness of at least 5.2 nm, the second dielectric portion, the metal portion having a thickness of at least 7 nm, and the third dielectric portion.

The first dielectric portion may have a single-layer structure composed of a dielectric material having a refractive index of 2.4 or more.

Alternatively, the first dielectric portion may have a structure in which a plurality of dielectric materials are laminated and at least one of the dielectric materials may have a refractive index of 2.4 or more.

The first dielectric portion and/or the third dielectric portion preferably contains at least one of $Nb_2O_5$, $TiO_2$, ZnS, $CeO_2$, and $Bi_2O_3$ in the form of a single dielectric material or as a part of a composite dielectric material.

In the case where the first dielectric portion is composed of a plurality of laminated transparent dielectric materials, when a dielectric material that is in contact with the recording material portion is a dielectric material Y and a dielectric material that is disposed at the laser beam incident side of the dielectric material Y is a dielectric material X, the dielectric material Y is preferably a transparent dielectric material having a refractive index satisfying the following relationship:

(Refractive index of dielectric material $Y$)$\geq$$-3.6\times$(Refractive index of dielectric material $X$)$+11$ In the optical information recording medium according to an embodiment, in the case where the semi-transmissive information recording layer has a structure including a first dielectric portion, a recording material portion, a second dielectric portion, a metal portion, and a third dielectric portion, in particular, the first dielectric portion is configured to have a refractive index of 2.4 or more, thereby improving the transmittance. Furthermore, the recording material portion has a thickness of at least 5.2 nm, and the metal portion has a thickness of at least 7 nm. Thus, a satisfactory recording/reproducing performance and storage property can be realized.

According an embodiment, in the case where the semi-transmissive information recording layer has a structure including a first dielectric portion, a recording material portion, a second dielectric portion, a metal portion, and a third dielectric portion, the transmittance can be improved by controlling the refractive index of the first dielectric portion to be 2.4 or more, and the semi-transmissive information recording layer can contribute to the realization of a multilayer disc and the like. In this case, the transmittance can be improved while a thickness of at least 5.2 nm is ensured in the recording material portion, and a thickness of at least 7 nm is ensured in the metal portion. Thus, a satisfactory recording/reproducing performance and storage property of the optical information recording medium can be ensured. Furthermore, the third dielectric portion is also configured to have a refractive index of 2.4 or more for the wavelength of a recording/reproducing laser beam. In addition, when the first dielectric portion has a certain refractive index of 2.4 or more, the third dielectric portion of the semi-transmissive information recording layer is configured to have a refractive index in a refractive index range where the transmittance of the semi-transmissive information recording layer is not more than 1% lower than the maximum transmittance of the semi-transmissive information recording layer. Thereby, the light transmittance of the semi-transmissive information recording layer can be controlled to be 65% or more, which is suitable for a three-layer recording medium or a four-layer recording medium.

Additional features and advantages are described herein, and will be apparent from the following Detailed Description and the figures.

BRIEF DESCRIPTION OF THE FIGURES

FIGS. 5A and 5B are tables showing optical properties and an energy distribution of a double-layer disc;

FIGS. 5C and 5D are tables showing optical properties and an energy distribution of a three-layer disc;

FIGS. 6A and 6B are tables showing optical properties and an energy distribution of a four-layer disc;

FIGS. 7A and 7B are tables showing optical properties and an energy distribution of a three-layer disc;

FIG. 9 is a table showing various Examples of materials of a semi-transmissive information recording layer according to an embodiment;

FIG. 14 is a table showing dielectric materials that can be used in an embodiment;

DETAILED DESCRIPTION

Embodiments will be described in the following order.
[1. Disc structure]
[2. Necessary optical properties and methods of realizing the same]
[3. Examples of semi-transmissive information recording layer]

[1. Disc Structure]

Figure 1A:
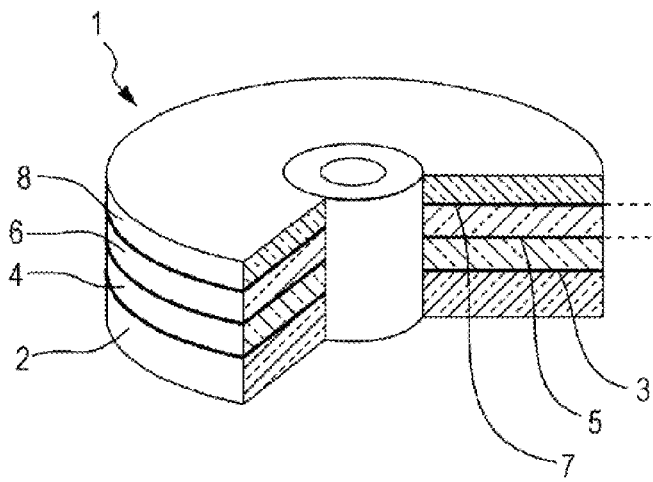
FIGS. 1A and 1B are views illustrating a layer structure of a three-layer disc according to an embodiment.
Figure 1B:
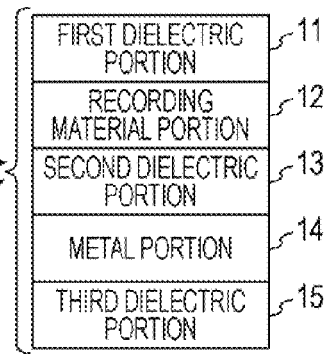
Figure 2A:
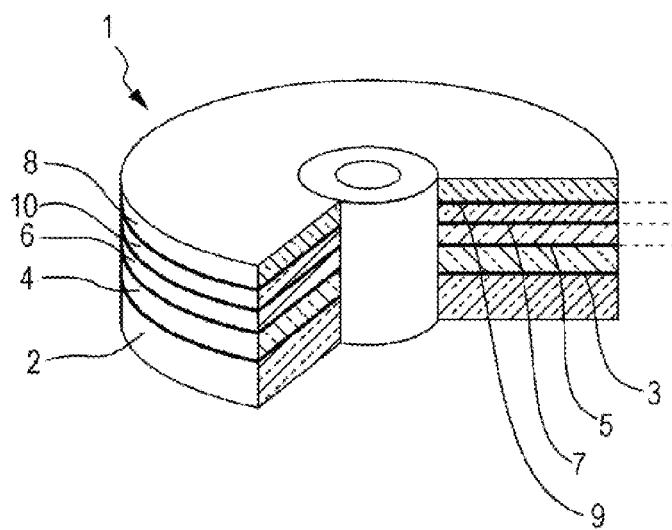
FIGS. 2A and 2B are views illustrating a layer structure of a four-layer disc according to an embodiment.
Figure 2B:
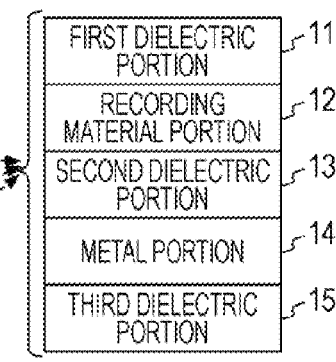

As a phase-change optical disc 1 of an embodiment, a structure of a three-layer disc is schematically shown in FIGS. 1A and 1B, and a structure of a four-layer disc is schematically shown in FIGS. 2A and 2B. The three-layer disc has a layer structure shown in FIG. 1A. Specifically, a first information recording layer 3 is disposed on a supporting substrate 2 made of a plastic, such as polycarbonate, or glass. A second information recording layer 5 is disposed on the first information recording layer 3, with a first interlayer 4 that is transparent to a wavelength of a recording/reproducing laser beam therebetween. Furthermore, a third information recording layer 7 is disposed on the second information recording layer 5, with a second interlayer 6 that is transparent to the wavelength of the recording/reproducing laser beam therebetween. In addition, a light-transmissive protective layer (cover layer) 8 that is transparent to the wavelength of the recording/reproducing laser beam is disposed on the third information recording layer 7. The laser beam used for recording and reproducing is incident from the light-transmissive protective layer 8 side. The laser beam emitted from a disc recording/reproducing device and incident from the light-transmissive protective layer 8 side is condensed on the first information recording layer 3, the second information recording layer 5, or the third information recording layer 7 in accordance with a focus control of the disc recording/reproducing device to perform recording and reproduction of information.

In the case of a four-layer disc, in addition to the structure of the thee-layer disc, a third interlayer 10 and a fourth information recording layer 9 are provided. Specifically, as shown in FIG. 2A, the four-layer disc has a layer structure in which a first information recording layer 3, a first interlayer 4, a second information recording layer 5, a second interlayer 6, a third information recording layer 7, a third interlayer 10, a fourth information recording layer 9, and a light-transmissive protective layer (cover layer) 8 are provided on a supporting substrate 2. A laser beam incident from the light-transmissive protective layer 8 side is condensed on any of the first information recording layer 3, the second information recording layer 5, the third information recording layer 7, and the fourth information recording layer 9 to perform recording and reproduction of information.

In the three-layer disc shown in FIGS. 1A and 1B, information recording layers other than the first information recording layer 3 which is closest to the supporting substrate 2, namely, the second information recording layer 5 and the third information recording layer 7 function as semi-transmissive information recording layers each having the layer structure shown in FIG. 1B. Also in the four-layer disc shown in FIGS. 2A and 2B, information recording layers other than the first information recording layer 3 which is closest to the supporting substrate 2, namely, the second information recording layer 5, the third information recording layer 7, and the fourth information recording layer 9 function as semi-transmissive information recording layers each having the layer structure shown in FIG. 2B.

As shown in FIGS. 1B and 2B, each of the semi-transmissive information recording layers includes a first dielectric portion 11, a recording material portion 12, a second dielectric portion 13, a metal portion 14, and a third dielectric portion 15 in that order when viewed from the light-transmissive protective layer 8 side (laser beam incident side). Specifically, in producing the disc, the semi-transmissive information recording layer is formed by sequentially depositing thin films functioning as the third dielectric portion 15, the metal portion 14, the second dielectric portion 13, the recording material portion 12, and the first dielectric portion 11 on the interlayer provided directly under the semi-transmissive information recording layer using a sputtering apparatus.

Each of the first dielectric portion 11, the second dielectric portion 13, and the third dielectric portion 15 of the semi-transmissive information recording layer may have a single-layer structure composed of one type of dielectric material or a multilayer structure in which a plurality of dielectric materials are laminated. For example, a recording and reproducing signal characteristic and the reliability of storage in terms of corrosion or the like may be affected by the combination of the first dielectric portion 11 and a phase-change recording material, the combination of the third dielectric portion 15 and a material constituting the interlayer that is in contact at the supporting substrate side, and the like. Accordingly, each of the first dielectric portion 11 and the third dielectric portion 15 may have a structure in which a plurality of suitable dielectric materials are laminated.

Figure 3:
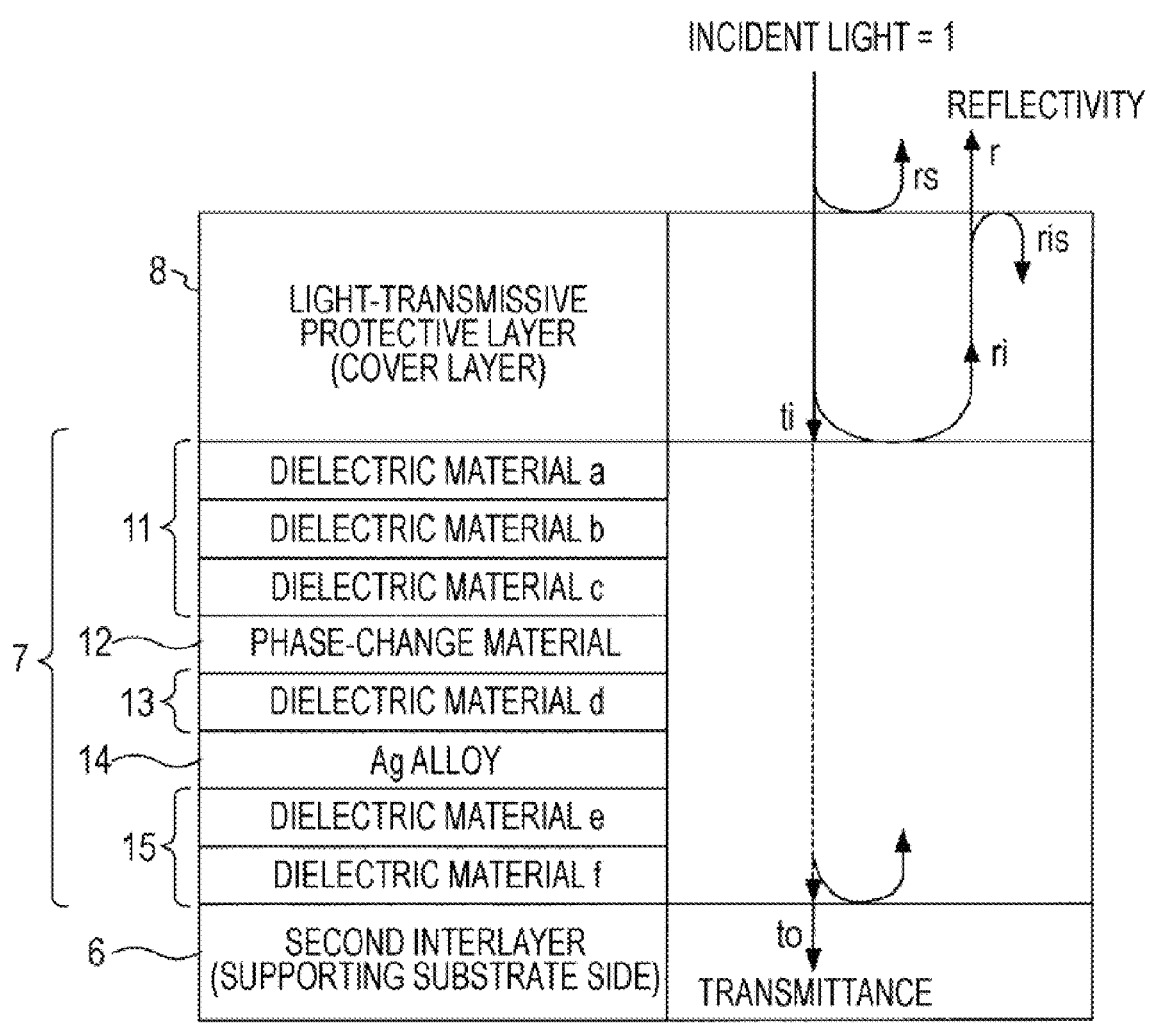
FIG. 3 is a view illustrating a structure of a semi-transmissive information recording layer according to an embodiment.

FIG. 3 shows an example of a laminated structure. In FIG. 3, the third information recording layer 7 in FIG. 1A is shown as an example of the semi-transmissive information recording layer. For example, the first dielectric portion 11 has a layer structure in which dielectric materials a, b, and c are laminated. The second dielectric portion 13 has a single-layer structure composed of a dielectric material d. The third dielectric portion 15 has a layer structure in which dielectric materials e and f are laminated. These are exemplifications, and the first dielectric portion 11, the second dielectric portion 13, and the third dielectric portion 15 may have other structures. For example, the first dielectric portion 11 may have a single-layer structure or a laminated structure composed of two dielectric materials. Similarly, the second dielectric portion 13 and the third dielectric portion 15 may have other structures.

The definitions of reflectivity and transmittance in the semi-transmissive information recording layer will now be described. In FIG. 3, a laser beam component is shown by the arrows. The reflectivity is shown by r in the figure. More specifically, when an incident laser beam irradiated from a disc recording/reproducing device to an optical disc is assumed to be "1", a light component reflected on the surface of the light-transmissive protective layer 8 is represented by rs, a light component entering the semi-transmissive information recording layer is represented by ti, a light component reflected on the semi-transmissive information recording layer is represented by ri, and among the light component ri, a light component reflected on the surface of the light-transmissive protective layer 8 is represented by ris. Specifically, the reflectivity r corresponds to a light component that is reflected on the semi-transmissive information recording layer and returns to the objective lens side of the disc recording/reproducing device when incident light=1. That is, the reflectivity r is one proportion of a light component reflected from the semi-transmissive information recording layer to the entirety of the incident light, when viewed from outside the disc. The reflectivity used in FIGS. 5B, 5D, 6B, and 7B described below means this reflectivity r. In contrast, in FIGS. 5A, 5C, 6A, and 7A, and FIG. 9 showing specific examples below, a reflectivity (ri/ti) is used. This reflectivity (ri/ti) is a ratio of reflected light to incident light when viewed only on the semi-transmissive information recording layer. The transmittance t is defined as t=to/ti wherein ti represents the light component ti shown in the figure, and to represents a light component that transmits through the semi-transmissive information recording layer.

Figure 4A:
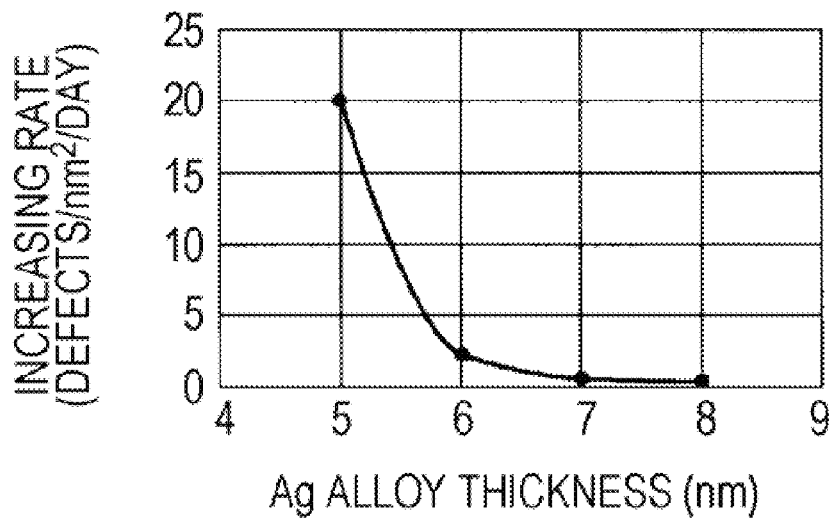
FIG. 4A is a graph used for setting the thickness of a metal portion according to an embodiment.
Figure 4B:
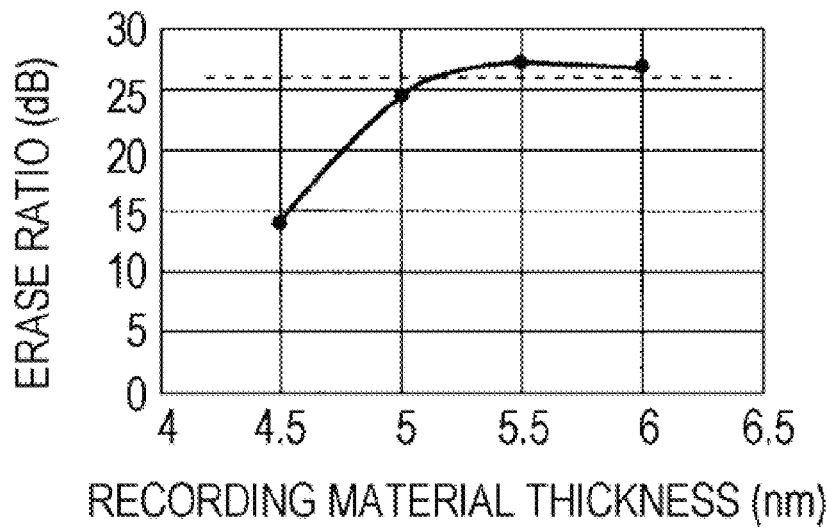
FIG. 4B is a graph used for setting the thickness of a recording material portion according to an embodiment.

Here, the thicknesses of the recording material portion 12 and metal portion 14 of the semi-transmissive information recording layer will be described. The recording material portion 12 is formed as a thin film made of a phase-change material. The metal portion 14 is formed as a reflective film made of a silver (Ag) alloy or the like. The transmittance of the semi-transmissive information recording layer strongly depends on the thicknesses of the recording material portion 12 and metal portion 14. It is believed that one technique for increasing the transmittance is to decrease the thicknesses of these portions 12 and 14. However, as describe above, as the thicknesses are decreased, corrosion resistance is degraded, the storage property is degraded, and a signal rewrite property (erase ratio) is decreased. Accordingly, in this embodiment, the lower limits of the thicknesses of the recording material portion 12 and metal portion 14 are determined. FIG. 4A shows the relationship between the corrosion resistance and the thickness of a Ag alloy, that is, measurement results of an increasing rate of defects in a reliability test. The results show that the number of defects increases when the thickness is less than 7 nm. FIG. 4B shows measurement results of the relationship between the thickness of the recording material and the signal rewrite property (erase ratio). An erase ratio of 26 dB is shown as a lower limit by the broken line. The results show that when the thickness of the recording material is 5.2 nm or more, the erase ratio exceeds the lower limit. According to these results, in the metal portion 14 made of a Ag alloy, 7 nm was the lower limit that can be used, and in the recording material portion 12, 5.2 nm was the lower limit that can be used. Considering various margins in the actual mass production, it is believed that a desirable lower limit of the metal portion 14 is 8 nm, and a desirable lower limit of the recording material portion 12 is 5.5 nm.

[2. Necessary Optical Properties and Methods of Realizing the Same]

Optical properties that are realized in this embodiment and methods of realizing the optical properties will be described. Although a three-layer disc and a four-layer disc are exemplified in FIGS. 1A and 1B, and FIGS. 2A and 2B, respectively, an optical information recording medium (optical disc) according to an embodiment covers a disc having two or more information recording layers. It is necessary that the second and higher information recording layers have a light-transmissive property so that a recording/reproducing laser beam reaches the first information recording layer, which is closest to a supporting substrate. Therefore, the second and higher information recording layers are formed as semi-transmissive information recording layers as described above.

In a double-layer disc that has been commercialized, the second information recording layer has a light transmittance in the range of 45% to 55%. FIG. 5A shows optical properties of recording layers in a double-layer disc. FIG. 5B shows the way in which incident light is used in the double-layer disc. FIG. 5A shows the reflectivity (ri/ti), the transmittance, and the absorptivity as the optical properties of a first information recording layer and a second information recording layer. FIG. 5B shows an energy distribution of the first information recording layer and second information recording layer in terms of the reflectivity (r) and the absorptivity when energy incident on the double-layer disc is assumed to be 100%.

As shown in FIG. 5B, the amounts of light energy absorbed in the first and second information recording layers differ by about ten percent, and thus recording powers also differ by the same degree. However, this difference is within an acceptable range in terms of unbalancing of the recording power. In a multilayer disc, the recording sensitivities of respective information recording layers can be matched by designing the layers so that the amounts of energy absorbed in the information recording layers are substantially the same as each other.

In the case where a third information recording layer is formed in addition to the first and second information recording layers to constitute a three-layer disc, the layers are designed so that the reflectivity (r) of the recording layers when viewed from outside the disc and recording sensitivities of the recording layers are matched with each other. Optical properties of the information recording layers of this case are shown in FIG. 5C, and an energy distribution of the incident light is shown in FIG. 5D. Similarly, in a four-layer disc, optical properties of information recording layers arc shown in FIG. 6A, and an energy distribution of the incident light is shown in FIG. 6D.

The recording sensitivity and reflectivity of each information recording layer can be independently finely adjusted. Therefore, the light transmittances of the semi-transmissive information recording layers shown in the figure are not exact. In FIG. 5C, the transmittance of the third information recording layer is 70%. However, in the case where a third information recording layer is formed, a light transmittance in the range of 65% to 75% can reliably ensure an optical balance and a balance of a recording power as a media. For example, when the transmittance of the third information recording layer in a three-layer disc is 65% and the values of reflectivity are matched with those shown in FIG. 5D, by slightly increasing the reflectivity of the first information recording layer and the second information recording layer to achieve the optical properties shown in FIG. 7A, the energy balance of the three-layer disc can be controlled as shown in FIG. 7B. In this case, there is a difference in the optical absorptivity between the information recording layers. The absorptivities of the first and third information recording layers are shifted from the absorptivity of the second information recording layer by about ten percent. Even when there is such a difference of ten percent, the recording sensitivity can be matched by optimizing the thermal design of the recording layers.

Similarly, in the case where a fourth information recording layer is formed in a four-layer disc, a light transmittance in the range of 73% to 83% can ensure the optical balance. Thus, as the number of information recording layers increases, it is necessary that the information recording layer closest to the light incident side have a higher light transmittance.

In a rewritable disc, as described above, each of the semi-transmissive information recording layers such as the second and higher information recording layers is formed by laminating films made of a phase-change recording material, a dielectric material, a metal, and the like using a sputtering apparatus. Specifically, a basic structure thereof includes, from the light incident side, a first dielectric portion 11, a recording material portion 12, a second dielectric portion 13, a metal portion 14, and a third dielectric portion 15 in that order. In such a semi-transmissive information recording layer of this embodiment, in order to realize a transmittance necessary for the third information recording layer and the fourth information recording layer, the first dielectric portion 11 has a refractive index of 2.4 or more. Note that in the case where the first dielectric portion 11 has a laminated structure including a plurality of dielectric materials (e.g., the laminated structure including the dielectric materials a, b, and c shown in FIG. 3), it is sufficient that at least one dielectric material included in the laminated structure has a refractive index of 2.4 or more.

Furthermore, in order to increase the transmittance as much as possible without decreasing the thicknesses of the recording material and metal film having absorption in the semi-transmissive information recording layer, both the first dielectric portion 11 and the third dielectric portion 15 preferably have a refractive index of 2.4 or more.

Furthermore, it was found that in order to maximize the transmittance in the case where high-refractive-index materials with a refractive index of 2.4 or more are used for the first dielectric portion 11 and the third dielectric portion 15, there should be a proper relationship between the refractive index of the first dielectric portion 11 and the refractive index of the third dielectric portion 15. More specifically, in order to obtain the maximum transmittance in the case where one of the refractive index of the first dielectric portion 11 and the refractive index of the third dielectric portion 15 is determined, the refractive index of the other dielectric material is preferably selected so that the combination of the refractive indices is selected from the combinations shown in the area surrounded by the dotted lines of FIG. 8. For example, when the refractive index of the first dielectric portion 11 is 2.4, the refractive index of the third dielectric portion 15 is selected from a range of 2.4 to 2.5. When the refractive index of the first dielectric portion 11 is 2.5, the refractive index of the third dielectric portion 15 is selected from a range of 2.4 to 2.7. When the refractive index of the first dielectric portion 11 is 2.6, the refractive index of the third dielectric portion 15 is selected from a range of 2.4 to 2.9. When the refractive index of the first dielectric portion 11 is 2.7, the refractive index of the third dielectric portion 15 is selected from a range of 2.4 to 3.0. When the refractive index of the first dielectric portion 11 is 2.8, the refractive index of the third dielectric portion 15 is selected from a range of 2.5 to 3.0. When the refractive index of the first dielectric portion 11 is 2.9, the refractive index of the third dielectric portion 15 is selected from a range of 2.6 to 3.0. When the refractive index of the first dielectric portion 11 is 3.0, the refractive index of the third dielectric portion 15 is selected from a range of 2.7 to 3.0.

Figure 8:
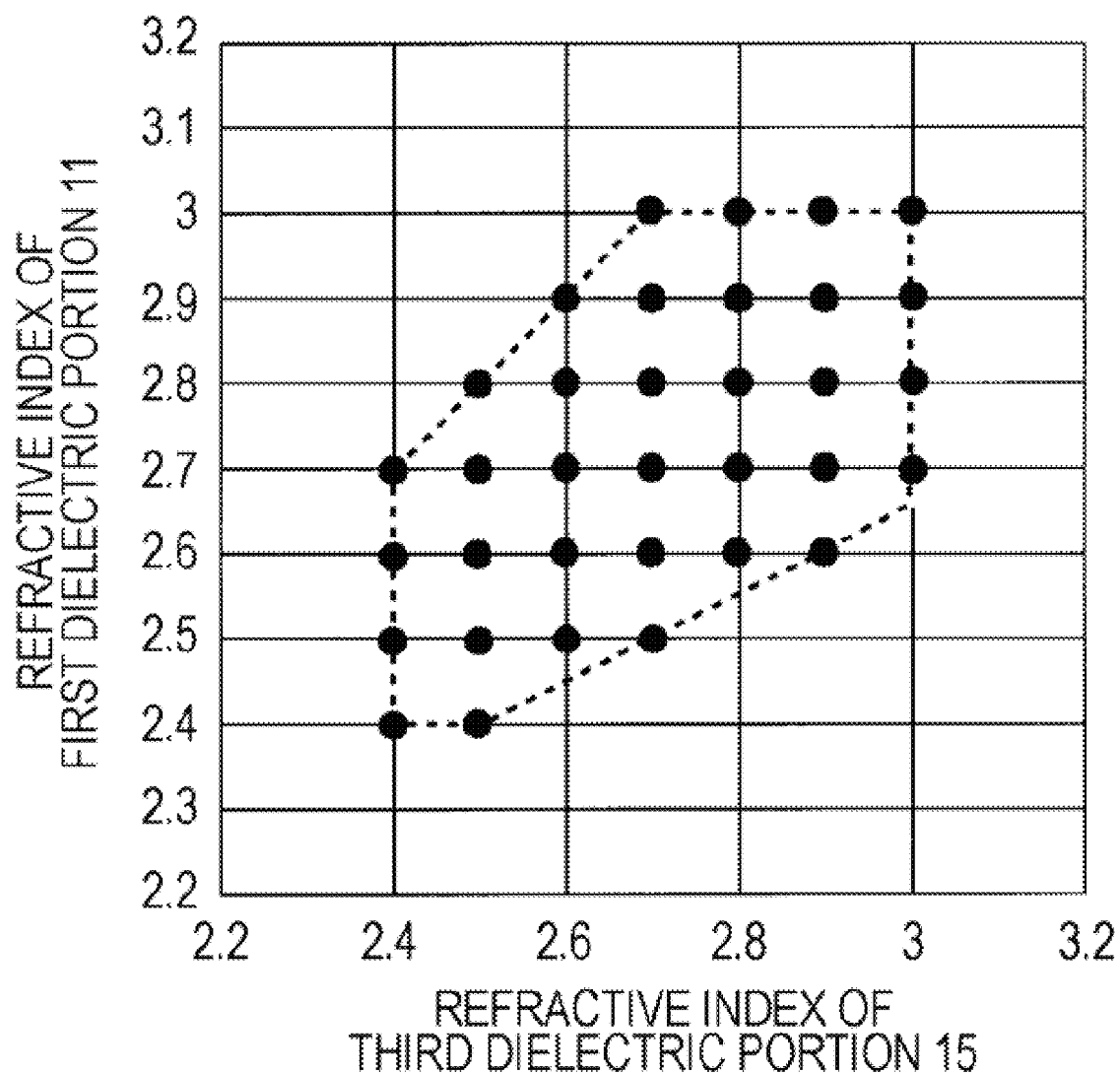
FIG. 8 is a graph showing combinations of refractive indices according to an embodiment.

As described below, the combinations in the area surrounded by the dotted lines of FIG. 8 show the cases when the first dielectric portion 11 has a certain refractive index of 2.4 or more, the third dielectric portion 15 is configured to have a refractive index in a refractive index range where the transmittance of the semi-transmissive information recording layer is not more than 1% lower than the maximum transmittance of the semi-transmissive information recording layer.

Examples of the materials having a refractive index of 2.4 or more and used as the first dielectric portion 11 and the third dielectric portion 15 include $Nb_2O_5$, $TiO_2$, ZnS, $CeO_2$, and $Bi_2O_3$. Specifically, each of the first dielectric portion 11 and the third dielectric portion 15 contains at least one of $Nb_2O_5$, $TiO_2$, ZnS, $CeO_2$, and $Bi_2O_3$ in the form of a single dielectric material or as a part of a composite dielectric material. The term "single dielectric material" means a material composed of a dielectric material having a basic structure, such as $SiO_2$ or ZnS. The term "composite dielectric material" means a material in which a plurality of dielectric materials each having a basic structure, such as $SiO_2$ or ZnS, are uniformly mixed at the atomic level. In addition, in high-refractive index materials, it is relatively difficult that the extinction coefficient in the complex refractive index is zero. An increase in the extinction coefficient decreases the light transmittance of an information recording layer. Accordingly, when such a high-refractive index material is used as the third information recording layer or the fourth information recording layer, satisfying a desired transmittance becomes more difficult. Therefore, in order to obtain a transmittance of 65% to 75% necessary for the third information recording layer, the extinction coefficient k is 0.04 or less, and preferably 0.01 or less.

Examples of the phase-change recording material include compounds represented by a composition formula of $Ge_aSb_2Te_{a+3}$ or $Ge_aBi_2Te_{a+3}$ ($1 \leq a \leq 20$); compounds in which the amounts of Ge and Te of these are finely adjusted, compounds having a composition in which $Ge_aSb_2Te_{a+3}$ and $Ge_aBi_2Te_{a+3}$ are mixed; and compounds in which an element is added to these in order to improve the recording information storage performance or the like in accordance with the application. These phase-change recording materials are used as a recording material of the semi-transmissive information recording layer. The thin film of the metal portion 14 is provided in order to efficiently dissipate heat mainly generated in the recording material layer. A Ag alloy is widely used as the metal portion 14 of the phase-change optical information recording medium. Silver (Ag) is a material having a high light-transmissive property and a high reflectivity in the blue wavelength range, as compared with other metals. Therefore, Ag is used as the metal portion 14 also in the semi-transmissive information recording layer.

[3. Examples of Semi-Transmissive Information Recording Layer]

Specific examples of the semi-transmissive information recording layer will now be described. As described above, the lower limit of the thickness of the metal portion 14 made of a Ag alloy is 7 nm, and the lower limit of the thickness or the recording material portion 12 is 5.2 nm. However, in the following specific examples, the thickness of the metal portion 14 is fixed to 8 nm, and the thickness of the recording material portion 12 is fixed to 5.5 nm. The thickness of each of the material layers is adjusted so that the reflectivity r satisfies the following. When the recording material is in a crystalline state, a reflectivity (Rc) is in the range of 1.8% to 2.2%, and the relationship Rc/Ra>4 is substantially satisfied wherein Ra represents a reflectivity when the recording material is in an amorphous state. The reflectivity r may be set to be in other ranges, for example, 2.3% to 2.7%. Also in such a case, a similar treatment can be performed.

In each of the specific examples, the semi-transmissive information recording layer has the structure shown in FIG. 3. Specifically, from the supporting substrate side, a dielectric material f, a dielectric material e, a Ag alloy, a dielectric material d, a phase-change recording material, a dielectric material c, a dielectric material b, and a dielectric material a are laminated on an interlayer in that order. A Ag alloy having a refractive index of 0.14-i2.2 was used, and the thickness of the Ag alloy was 8 nm. A phase-change recording material having a refractive index in a crystalline state of 1.8-i3.6 and a refractive index in an amorphous state of 2.8-i2.6 was used, and the thickness of the phase-change recording material was 5.5 nm. A material having a refractive index of 1.55 was used as the light-transmissive protective layer and the interlayer disposed at the supporting substrate side with respect to the recording layer. If the thickness of the Ag alloy or the thickness of the recording material is larger than the thickness in this case, the transmittance decreases.

FIG. 9 shows specific examples of Samples S1 to S10. Specifically, FIG. 9 shows combinations of various dielectric materials and the results of the reflectivity and transmittance in each of the combinations. The reflectivity shown in FIG. 9 represents the reflectivity (ri/ti) described above. Note that Samples S1 and S2 are comparative examples. Examples corresponding to this embodiment are Samples S3 to S10. Dielectric materials a, b, and c are shown as the first dielectric portion 11 in FIG. 9. Samples including only the dielectric material b are samples in which the first dielectric portion 11 has a single-layer structure. Samples including the dielectric materials a and b, the dielectric materials b and c, or the dielectric materials a, b, and c are samples in which the first dielectric portion 11 has a laminated structure. Similarly, dielectric materials e and f are shown as the third dielectric portion 15. Samples including only the dielectric material e are samples in which the third dielectric portion 15 has a single-layer structure. Samples including the dielectric materials e and f are samples in which the third dielectric portion 15 has a laminated structure.

The samples have the following structure. In all the samples, the second dielectric portion 13 is made of SiN having a refractive index of 2.1. Except for Sample S1, the thickness of the second dielectric portion 13 is 3 nm.

<S1>

In Sample S1 which is a comparative example, SiN is used as the dielectric material of each of the first dielectric portion 11, the second dielectric portion 13, and the third dielectric portion 15. The refractive index of SiN is 2.1. The first dielectric portion 11 has a thickness of 35 nm, the second dielectric portion 13 has a thickness of 10 nm, and the third dielectric portion 15 has a thickness of 15 nm.

<S2>

In Sample S2 which is a comparative example, SiN is used as the dielectric material of each of the first dielectric portion 11 and the second dielectric portion 13, and $Nb_2O_5$ is used as the dielectric material of the third dielectric portion 15. The refractive index of SiN is 2.1, and the refractive index of $Nb_2O_5$ is 2.55. The first dielectric portion 11 has a thickness of 35 nm, the second dielectric portion 13 has a thickness of 3 nm, and the third dielectric portion 15 has a thickness of 10 nm.

<S3>

In Sample S3, $Nb_2O_5$ having a refractive index of 2.55 is used as the dielectric material of the first dielectric portion 11, and SiN is used as the dielectric material of each of the second dielectric portion 13 and the third dielectric portion 15. The first dielectric portion 11 has a thickness of 29 nm, and the third dielectric portion 15 has a thickness of 37 nm.

<S4>

In Sample S4, $Nb_2O_5$ having a refractive index of 2.55 is used as the dielectric material of each of the first dielectric portion 11 and the third dielectric portion 15. The first dielectric portion 11 has a thickness of 32 nm, and the third dielectric portion 15 has a thickness of 25 nm.

<S5>

In Sample S5, $Nb_2O_5$ having a refractive index of 2.55 is used as the dielectric material of the first dielectric portion 11, and the thickness thereof is 30 nm. Furthermore, $TiO_2$ having a refractive index of 2.77 and a thickness of 5 nm and $Nb_2O_5$ having a refractive index of 2.55 and a thickness of 21 nm are used as the dielectric materials of the third dielectric portion 15.

<S6>

In Sample S6, $Nb_2O_5$ having a refractive index of 2.55 and a thickness of 25 nm, and SiN having a refractive index of 2.1 and a thickness of 5 nm are used as the dielectric materials of the first dielectric portion 11. Furthermore, $Nb_2O_5$ having a refractive index of 2.55 and a thickness of 25 nm is used as the dielectric material of the third dielectric portion 15.

<S7>

In Sample S7, $Nb_2O_5$ having a refractive index of 2.55 and a thickness of 25 nm, and SiN having a refractive index of 2.1 and a thickness of 5 nm are used as the dielectric materials of the first dielectric portion 11. Furthermore, $TiO_2$ having a refractive index of 2.77 and a thickness of 5 nm and $Nb_2O_5$ having a refractive index of 2.55 and a thickness of 20 nm are used as the dielectric materials of the third dielectric portion 15.

<S8>

In Sample S8, $Nb_2O_5$ having a refractive index of 2.55 and a thickness of 25 nm is used as the dielectric material b of the first dielectric portion 11, and SiN having a refractive index of 2.1 and a thickness of 5 nm is used as the dielectric materials a and c thereof. Furthermore, $Nb_2O_5$ having a refractive index of 2.55 and a thickness of 22 nm is used as the dielectric material of the third dielectric portion 15.

<S9>

In Sample S9, $SiO_2$ having a refractive index of 1.48 and a thickness of 10 nm and $Nb_2O_5$ having a refractive index of 2.55 and a thickness of 32 nm are used as the dielectric materials of the first dielectric portion 11. Furthermore, $Nb_2O_5$ having a refractive index of 2.55 and a thickness of 25 nm is used as the dielectric material of the third dielectric portion 15.

<S10>

In Sample S10, $SiO_2$ having a refractive index of 1.48 and a thickness of 10 nm, $Nb_2O_5$ having a refractive index of 2.55 and a thickness of 25 nm, and SiN having a refractive index of 2.1 and a thickness of 5 nm are used as the dielectric materials of the first dielectric portion 11. Furthermore, $Nb_2O_5$ having a refractive index of 2.55 and a thickness of 25 nm is used as the dielectric material of the third dielectric portion 15.

Referring to FIG. 9, the transmittances of Samples S3 to S10, in which the first dielectric portion 11 contains $Nb_2O_5$ which is a high-refractive index dielectric material having a refractive index of 2.4 or more, are higher than the transmittance of Sample S1, in which the first dielectric portion 11 (dielectric materials a, b, and c) and the third dielectric portion 15 (dielectric materials d and f) do not contain such a high-refractive index dielectric material. In addition, the transmittances of Samples S4 to S10, in which the first dielectric portion 11 and the third dielectric portion 15 contain the high-refractive index dielectric material ($Nb_2O_5$), are also higher than the refractive index of Sample S2, in which the third dielectric portion 15 contains the high-refractive index dielectric material but the first dielectric portion 11 does not contains such a high-refractive index dielectric material.

That is, by using a high-refractive index dielectric material as the first dielectric portion 11, the transmittance of the semi-transmissive information recording layer can be improved. Furthermore, the recording layer of each of Samples S4 to S10, in which both the first dielectric portion 11 and the third dielectric portion 15 contain a high-refractive index material (such as $Nb_2O_5$ having a refractive index of 2.55) ensures a transmittance of 65% and thus can satisfy optical properties of the third information recording layer 7 of a three-layer disc. Furthermore, as described below, by further increasing the transmittance, such a recording layer can satisfy optical properties of the fourth information recording layer 9 of a four-layer disc.

Sample S3, in which a high-refractive index dielectric material is contained only in the first dielectric portion 11, has a transmittance of about 60%. It is believed that the transmittance is somewhat insufficient from the standpoint of the third information recording layer 7 of a three-layer disc, but this sample is suitably used as the second information recording layer of a double-layer disc. In the case where this sample is used as the second information recording layer of a double-layer disc, it can be assumed that, conversely, the thicknesses of the metal portion 14 and recording material portion 12 can be increased by utilizing the fact that a more than sufficient transmittance can be obtained. This can also apply to Samples S4 to S10.

Note that Samples S3 to 10 described above are merely examples, and various modifications can be made to the materials and structures of the semi-transmissive information recording layer according to an embodiment.

Figure 10:
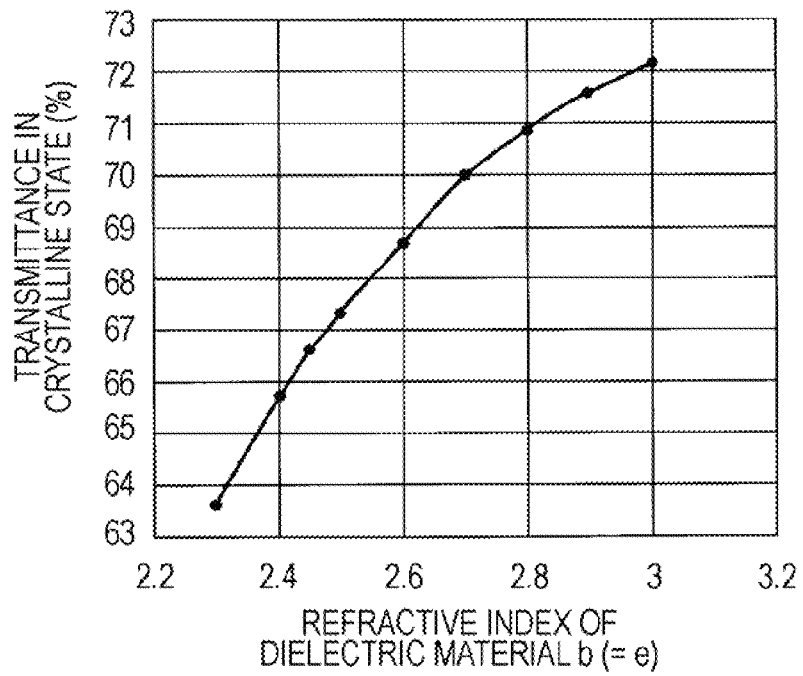
FIG. 10 is a graph showing the relationship between the refractive index and the maximum transmittance according to an embodiment.

As in, for example, Sample S6, it is assumed that the same material is used as the first dielectric portion 11 (dielectric material b) and the third dielectric portion 15 (dielectric material e), and the transmittance of the material is calculated using the refractive index thereof as a parameter. The results are shown in FIG. 10. Referring to FIG. 10, as the refractive index increases, the transmittance improves, and a refractive index of 2.4 or more can achieve a transmittance of 65% or more.

Figure 11:
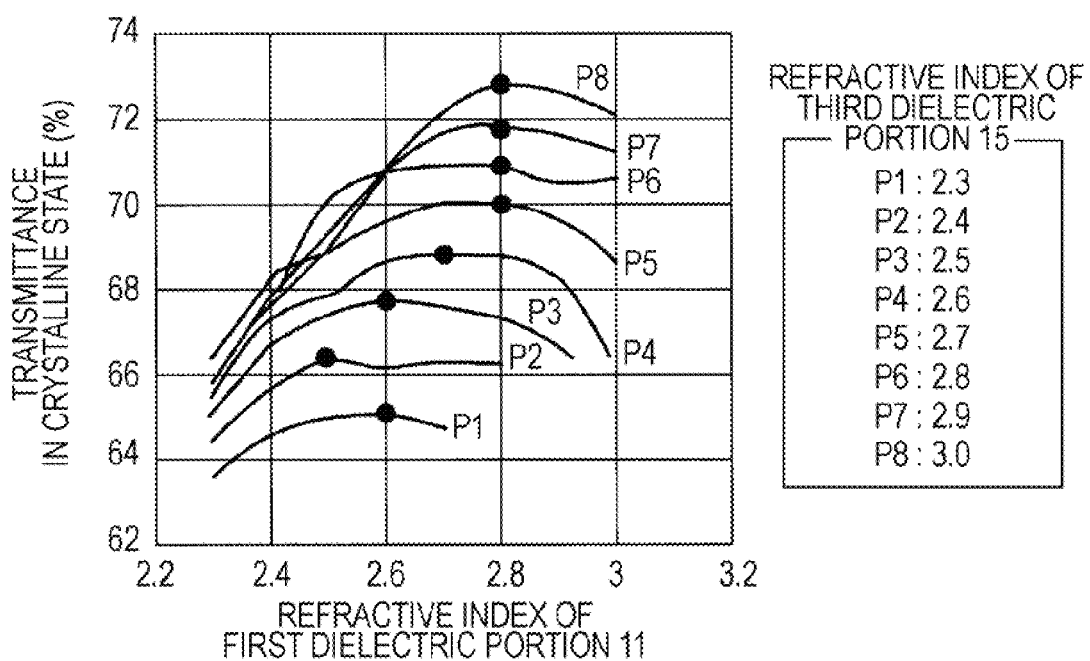
FIG. 11 is a graph showing the relationship between combinations of refractive indices and the maximum transmittance according to an embodiment.

As described above, in order to maximize the transmittance in the case where a high-refractive index dielectric material having a refractive index of 2.4 or more is used as the first dielectric portion 11 and the third dielectric portion 15, there should be a proper relationship between the refractive index of the first dielectric portion 11 and the refractive index of the third dielectric portion 15. FIG. 11 shows calculation results of the maximum transmittance with respect to refractive indices when the first dielectric portion 11 and the third dielectric portion 15 have various refractive indices. In FIG. 11, in the case where the refractive index of the third dielectric portion 15 is varied in the range of 2.3 to 3.0, the transmittance when the refractive index of the first dielectric portion 11 is varied in the range of 2.3 to 3.0 is shown by lines P1 to P8. Referring to FIG. 11, when the refractive index of the first dielectric portion 11 is determined, there is a refractive index range of the third dielectric portion 15 in which the transmittance becomes maximum for the refractive index of the first dielectric portion 11. In each of lines P1 to P8, the black circle shows the point at which the transmittance becomes the maximum.

Here, in FIG. 8, the area surrounded by the dotted lines shows the refractive index range of the third dielectric portion 15 in which the transmittance of the semi-transmissive information recording layer is decreased by 1% relative to the maximum transmittance obtained when the refractive index of the first dielectric portion 11 is determined. That is, by using a combination of the refractive index of the first dielectric portion 11 and the refractive index of the third dielectric portion 15, the combination lying in the area surrounded by the dotted lines, a satisfactory transmittance characteristic can be obtained, and the light transmittance as the semi-transmissive information recording layer can also be increased to 65% or more, for example, about 70%.

Figure 12:
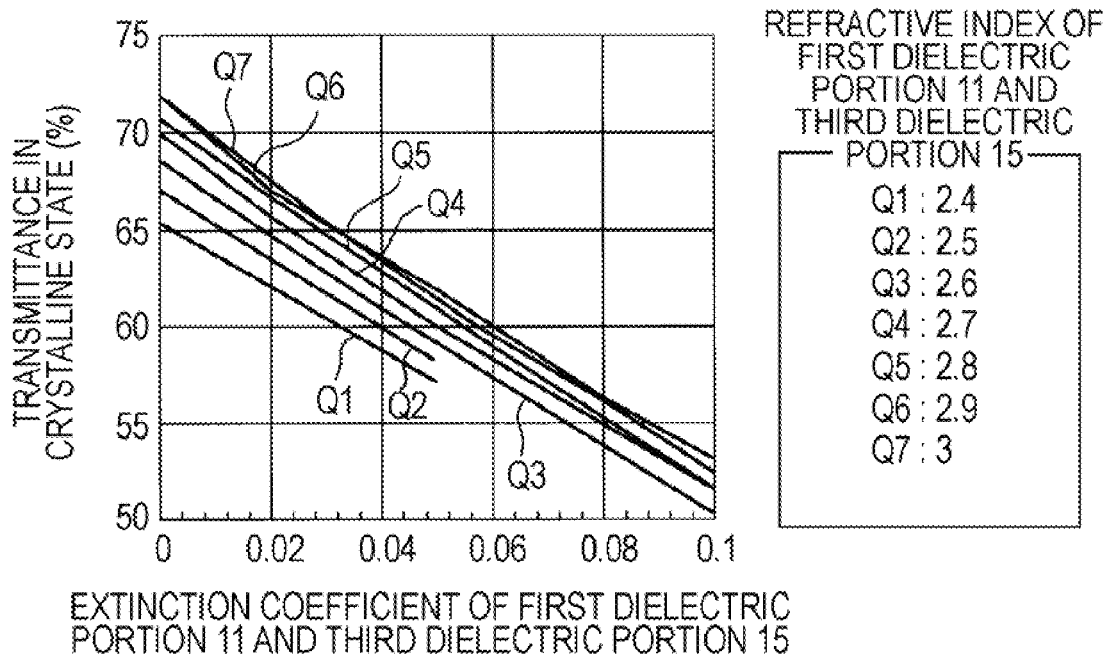
FIG. 12 is a graph showing the relationship between the extinction coefficient and the transmittance according to an embodiment.

Next, the extinction coefficient will be described. When a dielectric material of the first dielectric portion 11 and the third dielectric portion 15 has absorption of light, the transmittance decreases. Accordingly, a decreasing tendency of the light transmittance with respect to the extinction coefficient of a dielectric material was examined by a calculation. FIG. 12 shows a decreasing tendency of the transmittance in the case where a dielectric material of the first dielectric portion 11 and the third dielectric portion 15 has a refractive index in the range of 2.4 to 3.0 and an extinction coefficient of the dielectric material is generated. Lines Q1 to Q7 show the relationship between the extinction coefficient and the transmittance in the case where the refractive index is in the range of 2.4 to 3.0. The results shown in FIG. 12 show that even when a high-refractive index dielectric material having a refractive index of about 3.0 is used, if the extinction coefficient thereof exceeds 0.04, it is difficult to obtain a transmittance of 65%. Accordingly, the extinction coefficient of each of the first dielectric portion 11 and the third dielectric portion 15 is 0.04 or less, and particularly preferably 0.01 or less.

High-refractive index transparent dielectric materials having a refractive index of 2.4 or more will be described. High-refractive index transparent dielectric materials that can be used in the first dielectric portion 11 and the third dielectric portion 15 were examined, and the refractive indices of the materials were measured at a laser beam wavelength of, for example, 405 nm, which is used in a Blu-ray Disc. As a result, materials shown in FIG. 14 were obtained. Namely, examples thereof include $Nb_2O_5$, $TiO_2$, $ZnS$, $CeO_2$, and $Bi_2O_3$. However, the refractive index and the extinction coefficient vary depending on sputtering conditions. Therefore, a state of a thin film made of each of the materials obtained when the refractive index and the extinction coefficient are values shown in FIG. 14 is not necessarily the optimum state of the thin film. Although $Bi_2O_3$ has a slightly high extinction coefficient, the extinction coefficient can be decreased by combining a transparent dielectric material. For example, $Bi_{12}SiO_{20}$ ($Bi_2O_3$:$SiO_2$=6:1) is known as an optical crystal, and the extinction coefficient thereof is sufficiently less than 0.01.

Figure 13:
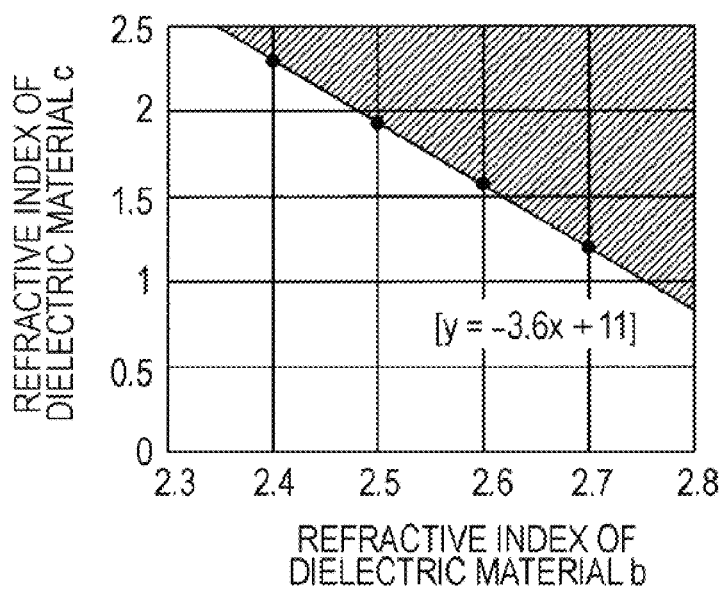
FIG. 13 is a graph showing the relationship between dielectric materials for obtaining a transmittance of 65% according to an embodiment.
Figure 15A:
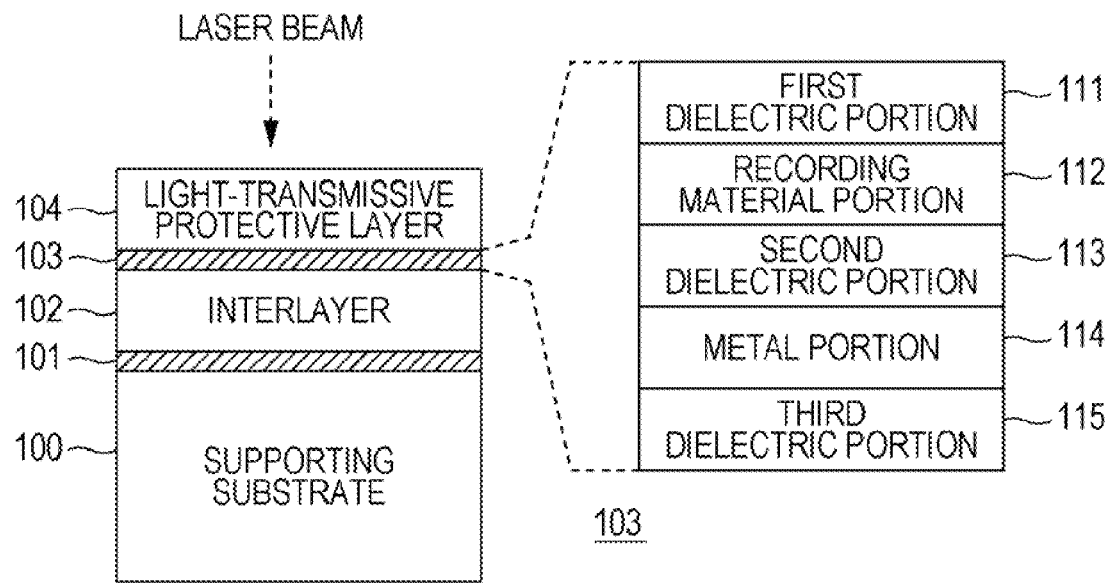
FIG. 15A is a view illustrating a double disc.
Figure 15B:
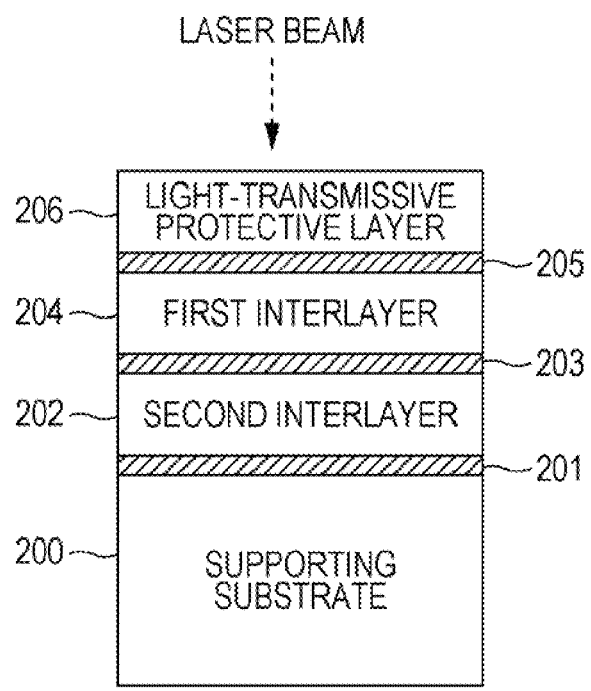
FIG. 15B is a view illustrating a three-layer disc.

Furthermore, in the case where the first dielectric portion 11 has a laminated structure including three layers made of dielectric materials and a dielectric material a, a dielectric material b, and a dielectric material c are disposed in that order from the laser beam incident side, a range of combinations of the refractive indices of the dielectric material b and dielectric material c in which a transmittance of 65% or more can be obtained was examined. The dielectric material c is a dielectric material that is in contact with a recording material portion. The dielectric material b is a dielectric material that is disposed at the laser beam incident side of the dielectric material c. The dielectric material b and the third dielectric portion 15 (dielectric material e) are preferably the same material in view of the above conditions. Accordingly, in this example, the dielectric material b and the third dielectric portion 15 had the same refractive index. Consequently, the results shown in FIG. 13 were obtained. FIG. 13 shows the relationship between the refractive index of the dielectric material b and the refractive index of the dielectric material c. In FIG. 13, the hatched area shows an area where the transmittance is 65% or more. Accordingly, the relationship between the refractive index of the dielectric material b and the refractive index of the dielectric material c for achieving a transmittance of 65% is shown by the straight line of FIG. 13. The area where the transmittance is 65% or more lies in the hatched area located on the upper side of this straight line, more specifically, an area where the relationship (Refractive index of dielectric material c)$\geq -3.6\times$(Refractive index of dielectric material b)+11 is satisfied. Accordingly, dielectric materials satisfying the above condition are adequately selected. As for the refractive index of the dielectric material a, even when any material having a refractive index in the range of 1.4 to 3.0 was used, a transmittance equivalent to the maximum transmittance obtained when the dielectric material a is not arranged could be achieved by optimizing the film thickness. However, this was achieved when the dielectric material a did not have absorption. In this example, the dielectric material c corresponds to a dielectric material Y according to an embodiment, and the dielectric material b corresponds to a dielectric material X according to an embodiment of.

Embodiments have been described. In the semi-transmissive information recording layer described in the embodiments, the first dielectric portion 11, or both the first dielectric portion 11 and the third dielectric portion 15 have a refractive index of 2.4 or more. In particular, a combination of the refractive indices of high-refractive index dielectric materials contained in the first dielectric portion 11 and the third dielectric portion 15 is selected from the combinations within the area surrounded by the dotted lines of FIG. 8. Thereby, a light transmittance of 65% or more for a recording/reproducing laser wavelength can be achieved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical information recording medium comprising:
    a supporting substrate;
    a light-transmissive protective layer disposed at a side of the optical information recording medium on which a recording/reproducing laser beam is incident;
    a plurality of information recording layers; and
    at least one interlayer which is transparent to the recording/reproducing laser beam having a wavelength in the range of 400 to 410 nm, and each interlayer is disposed between adjacent information recording layers, the information recording layers and the at least one interlayer being disposed between the supporting substrate and the light-transmissive protective layer,
    wherein, among the plurality of information recording layers, one or a plurality of information recording layers other than the information recording layer closest to the supporting substrate each function as a semi-transmissive information recording layer that transmits the laser beam, and
    some or all of the one or the plurality of semi-transmissive information recording layers have a structure including a first dielectric portion having a refractive index of 2.4 or more for the wavelength of the recording/reproducing laser beam, a recording material portion having a thickness of at least 5.2 nm, a second dielectric portion, a metal portion having a thickness of at least 7 nm, and a third dielectric portion sequentially laminated in that order from the incident side of the laser beam.

2. The optical information recording medium according to claim 1, wherein the third dielectric portion has a refractive index of 2.4 or more for the wavelength of the recording/reproducing laser beam.

3. The optical information recording medium according to claim 2, wherein when the first dielectric portion has a certain refractive index of 2.4 or more, the third dielectric portion of the semi-transmissive information recording layer is configured to have a refractive index in a refractive index range where the transmittance of the semi-transmissive information recording layer is not more than 1% lower than the maximum transmittance of the semi-transmissive information recording layer to control the light transmittance of the semi-transmissive information recording layer to be 65% or more.

4. The optical information recording medium according to claim 3, wherein each of the first dielectric portion and the third dielectric portion has an extinction coefficient of 0.04 or less.

5. The optical information recording medium according to claim 1,
    wherein the information recording layers include a first information recording layer closest to the supporting substrate and a second information recording layer and a third information recording layer which function as the semi-transmissive information recording layers, and
    the third information recording layer has a structure including the first dielectric portion having a refractive index of 2.4 or more for the wavelength of the recording/reproducing laser beam, the recording material portion having a thickness of at least 5.2 nm, the second dielectric portion, the metal portion having a thickness of at least 7 nm, and the third dielectric portion.

6. The optical information recording medium according to claim 1,
    wherein the information recording layers include a first information recording layer closest to the supporting substrate and a second information recording layer, a third information recording layer, and a fourth information recording layer which function as the semi-transmissive information recording layers, and
    each of the third information recording layer and the fourth information recording layer has a structure including the first dielectric portion having a refractive index of 2.4 or more for the wavelength of the recording/reproducing laser beam, the recording material portion having a thickness of at least 5.2 nm, the second dielectric portion, the metal portion having a thickness of at least 7 nm, and the third dielectric portion.

7. The optical information recording medium according to claim 1, wherein the first dielectric portion has a single-layer structure composed of a dielectric material having a refractive index of 2.4 or more.

8. The optical information recording medium according to claim 1,
    wherein the first dielectric portion has a structure in which a plurality of dielectric materials are laminated, and
    at least one of the dielectric materials has a refractive index of 2.4 or more.

9. The optical information recording medium according to claim 1,
    wherein the first dielectric portion contains at least one of $Nb_2O_5$, $TiO_2$, $ZnS$, $CeO_2$, and $Bi_2O_3$ in the form of a single dielectric material or as a part of a composite dielectric material.

10. The optical information recording medium according to claim 1, wherein the third dielectric portion contains at least one of $Nb_2O_5$, $TiO_2$, $ZnS$, $CeO_2$, and $Bi_2O_3$ in the form of a single dielectric material or as a part of a composite dielectric material.

11. The optical information recording medium according to claim 1,
    wherein in the case where the first dielectric portion is composed of a plurality of laminated transparent dielectric materials, when a dielectric material that is in contact with the recording material portion is a dielectric material Y and a dielectric material that is disposed at the laser beam incident side of the dielectric material Y is a dielectric material X,
    the dielectric material Y is a transparent dielectric material having a refractive index satisfying the following relationship:

(Refractive index of dielectric material Y)≧−3.6× (Refractive index of dielectric material X)+11.

12. The optical info' ination recording medium according to claim 1, wherein the recording material portion has a thickness of at least 5.5 nm.

13. The optical information recording medium according to claim 1, wherein the metal portion has a thickness of at least 8 nm.

14. The optical information recording medium according to claim 5, wherein a first optical absorptivity of the first information recording layer and a third optical absorptivity of the third information recording layer are each shifted from a second optical absorptivity of the second information recording layer by about 10%.

15. The optical information recording medium according to claim 1, wherein the first dielectric portion and the second dielectric portion are each in contact with the recording material portion, and wherein the second dielectric portion and the third dielectric portion are each in contact with the metal portion.

* * * * *